Dec. 12, 1961 D. R. DODD 3,012,737
COMBINATION LAND AND AIR VEHICLE
Filed Jan. 8, 1960
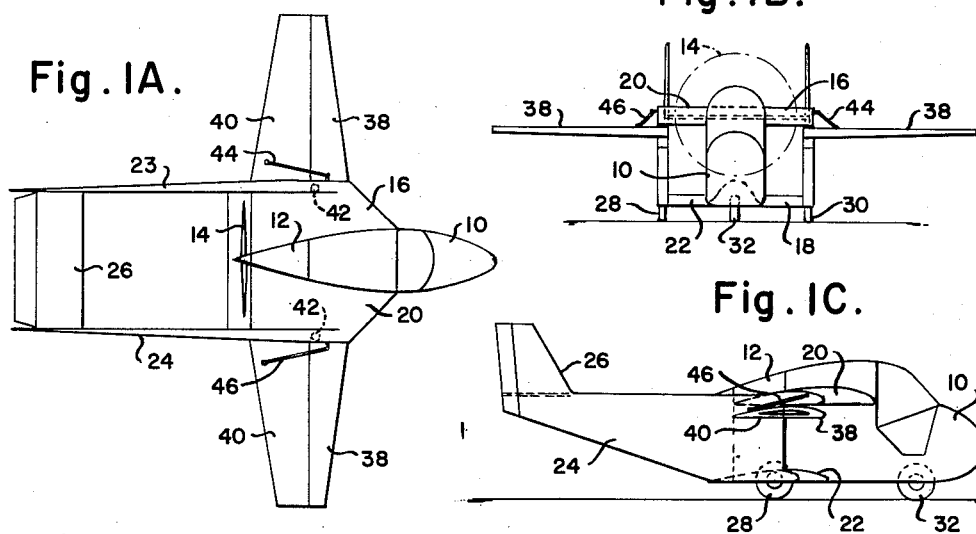
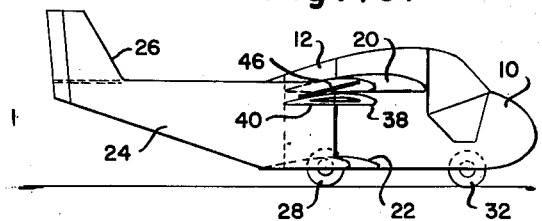
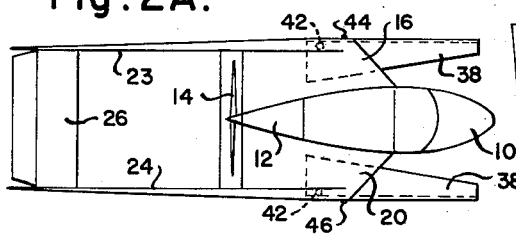
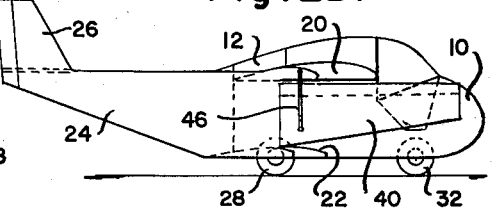
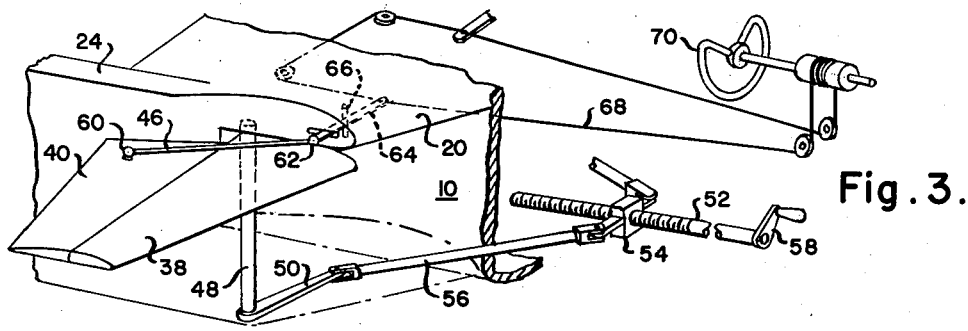
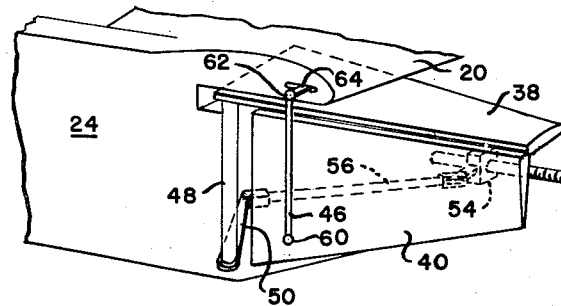
INVENTOR
David R. Dodd
By
Attorney ns Patent Office
3,012,737
Patented Dec. 12, 1961

3,012,737
COMBINATION LAND AND AIR VEHICLE
David R. Dodd, 15 Reynolds Road, Mount Tammany, Rte. 2, Williamsport, Md.
Filed Jan. 8, 1960, Ser. No. 1,361
5 Claims. (Cl. 244—2)

This invention relates to a vehicle which may be converted from an aircraft into a screw-propelled land vehicle and vice versa. More particularly, the invention relates to a combination land and air vehicle having a new and improved retractable wing structure.

As an overall object, the present invention seeks to provide a new and improved vehicle of the type described which is a self-contained unit, meaning that its wings and other parts necessary for flying need not be detached and stored while it travels over ground surfaces. Thus, no part of the vehicle need be based at an airport. Consequently, it can land at one location, travel over the ground to another distant location, and then take off without returning to its original landing point. The invention is designed for highway use while on the ground and employs a propeller or other similar device for propelling the craft while in the air as well as on the ground. With this arrangement, the need for a second power unit and wheel drive is eliminated; and when highways are dangerously slippery, the invention is safer and more dependable than conventional automobiles due to the fact that it employs forward propeller pitch thrust for locomotion and reverse pitch thrust for stopping.

The invention also has as one of its objects the provision, in a combination land and air vehicle, of collapsable outer wing sections which may be retracted for land travel or extended into flight position by a control located within the control cockpit of the craft, and characterized in having no removable or loose parts to handle or lose. In this manner the operator may retract or extend the wing sections while remaining in the cockpit. Furthermore, the wing sections may be manipulated into the desired position while the vehicle is moving; however, they cannot be retracted or extended accidentally either in flight or on the ground.

Still another object of the invention resides in the provision of a retractable aircraft wing section in which an aileron at the trailing edge of the section forms a substantial part of the wing structure and may be folded or collapsed so as to decrease the effective width of the structure when retracted. The arrangement is such that when extended, the wing sections shift the center of gravity of the vehicle forward for better ground control and stability.

Further, the present invention seeks to provide a mechanism for an aileron, of the type described above, which serves the dual purpose of controlling the aileron in flight while automatically collapsing it when the wing section is retracted. Such an arrangement not only simplifies design and reduces cost but also minimizes the overall weight of the vehicle.

Another feature of the invention resides in the provision of a rear engine mounting for a roadable aircraft together with a novel tail structure which provides a protective shroud for the propeller while the vehicle is on the ground.

The above and other objects and features of the invention will become apparent from the following detailed description taken in connection with the accompanying drawings which form a part of this specification and in which:

FIG. 1A is a top or plan view of the combination land and air vehicle of the present invention, showing its retractable wing sections in extended or flight position;

FIG. 1B is an end view of the vehicle shown in FIG. 1A;

FIG. 1C is a side view of the vehicle shown in FIG. 1A;

FIG. 2A is a top or plan view of the combination land and air vehicle of the present invention, showing its outer wing sections in retracted position;

FIG. 2B is a side view of the vehicle of the invention showing its outer wing sections in retracted position;

FIG. 3 is a schematic illustration of the mechanism for retracting or extending the outer wing sections of the vehicle shown in FIGS. 1A–2B, together with the control means for the ailerons of the retractable wing sections; and FIG. 4 is a schematic illustration, similar to that of FIG. 3, showing the outer wing sections in retracted or folded position.

Referring to FIGS. 1A–1C, the embodiment of the invention shown comprises a passenger-carrying fuselage or nacelle 10 having an engine 12 and a pusher-type propeller 14 mounted on its aft portion. Extending outwardly from one side of the nacelle 10 are a first pair of vertically spaced stub wing sections 16 and 18; and, similarly, a second pair of vertically spaced stub wing sections 20 and 22 extend outwardly from the other side of the nacelle. Supported at the extremities of each pair of stub wing sections, and extending therebetween, is a rearwardly-extending tail boom 23 or 24. A tail structure, generally indicated at 26, interconnects the trailing ends of the tail booms 23 and 24, substantially as shown. As is best shown in FIG. 1C, each tail boom 23 or 24 extends between the stub wing sections on which it is supported and gradually tapers down as it approaches the tail structure 26. This arrangement provides a shroud or protective enclosure for the propeller 14 when the vehicle is on the ground and minimizes the possibility of injuries to pedestrians which might otherwise occur if the propeller blades were exposed. The two rear wheels 28 and 30 of a tricycle landing gear are supported at the bottoms of the forward ends of the tail booms 23 and 24, while the third or steerable nose wheel 32 of the landing gear is supported beneath the forward end of the nacelle 10.

Extending outwardly from the lower surfaces of the upper stub wing sections 16 and 20 are a pair of outer, retractable wing sections, each of which consists of a forward wing structure 38 and an aileron 40 hinged or pivoted along its entire trailing edge. Each forward wing structure 38 is rotatable in a forwardly direction about a vertical axis, generally indicated at 42 in FIG. 1A. When the wing sections are rotated into their extended or flying positions, as shown in FIGS. 1A–1C, the ailerons 40 will be held in a more or less horizontal position by a pair of control linkages 44 and 46. As shown, each of the control linkages has its forward end connected by means of a universal joint to an end of the stub wing section 16 or 20. The other end of each of the control linkages is connected by means of a similar universal joint to the upper surface of its associated aileron 40.

When the forward wing structures 38 are rotated forwardly about axes 42, they will assume a generally horizontal position extending substantially parallel to the axis of nacelle 10. As the forward wing structures 38 are rotated forwardly in this manner, the distance between the ailerons 40 and the universal connections of the control linkages 44 and 46 to the stub wing sections will decrease. Consequently, the ailerons 40 will rotate downwardly into a generally vertical position. The appearance of the vehicle with the outer wing sections retracted is shown in FIGS. 2A and 2B. It will be noted that when the wing sections are fully retracted, the control linkages 44 and 46 extend downwardly in a vertical direction as do the ailerons 40. At the same time, the forward wing structures 38 are drawn in close to the nacelle 10 and parallel thereto. With the forward wing structures 38 and the ailerons 40 rotated forwardly into a retracted position, the center of gravity of the vehicle shifts forwardly for ground travel. This, in effect, transfers more weight to the forward castering wheel 32 and facilitates better ground control and stability.

The details of the control mechanism for the retractable wing sections are shown in FIGS. 3 and 4. Each of the forward wing structures 38 is secured at the inboard end of its trailing edge to a generally vertical pivot tube 48 which rotates between, and is secured to, the two stub wing sections 20 and 22. Fastened to the lower end of the pivot tube 48 is an arm 50. The entire assembly of arm 50, pivot tube 48 and forward wing structures 38 is rotated by means of a mechanism including a screw 52 which will move nut 54 forward or aft, depending upon the direction of rotation of the screw. The arm 50 is operatively connected to nut 54 by means of linkage 56, substantially as shown. Thus, when the screw 52 is rotated in one direction, the nut 54 will move aft while arm 50, pivot tube 48 and the forward wing structure 38 rotate in a forwardly or counter-clockwise direction as viewed in FIG. 3. Similarly, rotation of the screw 52 in the opposite direction will rotate the wing section 38 in a clockwise direction and into its extended or flight position. The forward end of screw 52 is provided with a crank arm 58 which is located within the cockpit of nacelle 10 whereby the pilot may retract or extend the wing sections without leaving the cockpit.

As shown in FIG. 3, the linkage 46 is connected at its one end to the aileron 40 by means of a ball and socket joint 60, however any other type of universal joint may be used in its place. The other end of the linkage 46 is connected by means of a similar ball and socket joint 62 to the outer end of a linkage 64 which is pivotal about a pin 66 extending substantially parallel the axis of pivot tube 48. The opposite end of linkage 64 is connected through cables 68 to a hand wheel 70 located in the cockpit. When the outer wing sections are in extended position, the hand wheel 70 will control the lateral axis of the craft in flight as is the case in any conventional airplane. Thus, when hand wheel 70 is rotated to the right, linkage 64 will rotate in a counter-clockwise direction about pin 66, linkage 46 will move forward, and the aileron 40 will rotate upward. At the same time the aileron 40 on the other side of the vehicle will rotate downward to cause the vehicle to bank to the right when in flight. As will be understood, the hand wheel 70 is also connected by means, not shown, to the steerable nose wheel 32. The rudders on the twin tail section 26 are connected to rudder pedals, not shown, as in any conventional aircraft. Forward and aft movement of the hand wheel or control column is connected to the elevator by means, not shown, for control of longitudinal pitching as in any conventional aircraft.

In order to rotate the forward wing structures 38 from their extended or flight positions shown in FIG. 3 to their retracted positions shown in FIG. 4, the crank arm 58 is rotated by the pilot in the cockpit to move nut 54 aft. This causes the forward wing structure 38 to rotate in a counter-clockwise direction as viewed in FIG. 3 until it reaches the position shown in FIG. 4 which is the fully retracted position. As the forward wing structure 38 rotates forwardly, the distance between the aileron 40 and the ball and socket joint 62 decreases. Consequently, the aileron 40 drops or rotates downwardly until it reaches the substantially vertical position shown in FIG. 4. To extend the wing sections, the foregoing process is merely reversed. While the aircraft is on the ground it may be steered by means of the forward nose wheel 32. During this time, the cable 68 will, of course, pivot the linkages 64 about their pivot pins 66. However, it will be seen from FIG. 4 that movement of the joint 62 forward or aft while the aileron 40 is folded downwardly has no effect whatever on the position of the aileron. As will be understood, the combination of linkages 46 and 64 has the dual purpose of controlling the aileron while the vehicle is in flight as well as folding the aileron into its retracted position for land travel. At the same time, the novel arrangement of the linkages 46 and 64 permits the hand wheel 70 to be used in steering the forward nose wheel of the vehicle while it is on the ground. When it is desired to lower the flaps in making an approach to a landing strip, the forward wing structures 38 may be rotated forwardly slightly, thereby pushing both of the ailerons 40 downwardly. The ailerons may also be used in this manner for longitudinal trim correction.

It should be apparent that at least part of the lift for the vehicle while in flight is provided by the stub wing sections 16, 18, 20 and 22. The lift provided by these stub wing sections, however, is insufficient to elevate the vehicle at its maximum ground speed with the outer wing sections retracted. When the outer wing sections are extended, however, the combination of the lift provided by the outer wing sections with that provided by the stub wing sections will be sufficient to render the vehicle flyable. This feature, of course, has the advantage of requiring shorter outer wing sections which must be retracted into the positions shown in FIGS. 2A and 2B for land travel. At the same time, the structural shape of the airframe, including nacelle 10 and the stub wing sections, allows for high strength at low weight without the use of any external wires or bracing. This shape also allows all parts of the retracting mechanism to be aerodynamically contained or enclosed and lends itself to retractable landing gear at a negligible weight increase.

The invention thus provides a new and novel combination land and air vehicle employing retractable outer wing sections, and characterized in having a single mechanism for controlling the ailerons on the outer wing sections during flight as well as folding the wing sections into retracted position while the vehicle is on the ground. Although the invention has been shown in connection with a certain specific embodiment, it will be readily apparent to those skilled in the art that various changes in form and arrangement of parts may be made to suit requirements without departing from the spirit and scope of the invention. In this respect, it is apparent that a ducted fan jet engine or other similar device could be used to drive the vehicle in place of propeller 14 and that various other arrangements, such as an electric or hydraulic drive motor, could be employed to rotate the pivot tubes 48.

I claim as my invention:

1. A combination land and air vehicle comprising a passenger-carrying fuselage having a pair of stub wing sections extending outwardly from either side thereof, and retractable outer wing sections carried at the extremities of said stub wing sections, each of said outer wing sections comprising a forward wing structure having an aileron hinged along its entire trailing edge, and a dual purpose mechanism connected to said aileron and to said stub-wing for controlling the position of the aileron when the outer wing structure is extended while serving to position the aileron with respect to the forward wing structure so as to decrease the total width of the outer wing section when it is retracted.

2. A combination land and air vehicle comprising a passenger-carrying fuselage having a pair of stub wing sections extending outwardly from either side thereof, retractable outer wing sections carried at the extremities of said stub wing sections, each of said outer wing sections comprising a forward wing structure pivotal about an axis extending substantially perpendicular to the under surface of its associated stub wing section, said forward wing structure being rotatable from an extended position where it projects outwardly from the end of the stub wing section to a retracted position where it extends forwardly of the stub wing section and parallel to the longitudinal axis of said fuselage, an aileron hinged to the trailing edge of said forward wing structure, and a linkage having a universal connection at its opposite ends to the aileron and the end of said stub wing section respectively.

3. The combination claimed in claim 2 wherein the universal connection of the linkage to the stub wing section is located forwardly of the axis about which the forward wing structure rotates.

4. A combination land and air vehicle comprising a passenger-carrying fuselage having a pair of stub wing sections extending outwardly from either side thereof, retractable outer wing sections carried at the extremities of said stub wing sections, each of said outer wing sections comprising a forward wing structure pivotal about an axis extending substantially perpendicular to the under surface of its associated stub wing section, said forward wing structure being rotatable from an extended position where it projects outwardly from the end of the stub wing section to a retracted position where it extends forwardly of the stub wing section and parallel to the longitudinal axis of said fuselage, an aileron hinged to the trailing edge of said forward wing structure, a first linkage mounted on said stub wing section and pivotal about an axis extending substantially parallel to the axis about which said forward wing structure rotates, pilot-operated aileron control means operatively connected to one end of said first linkage, and a second linkage having a universal connection at its opposite ends to said aileron and the other end of said first linkage respectively, the arrangement being such that when the forward wing structure is placed in its extended position the aileron will be rotated upwardly where said first linkage may control its position, while the aileron will be rotated downwardly into a generally vertical position when the forward wing structure is rotated into retracted position.

5. The combination claimed in claim 4 wherein the axis about which the forward wing structure rotates is located at the trailing edge of the inboard end of the forward wing structure and wherein the universal connection of the second linkage to the said other end of the first linkage is located forwardly of the said axis about which the forward wing structure rotates.

References Cited in the file of this patent

UNITED STATES PATENTS

| | | |
|---|---|---|
| 2,713,465 | Novinger | July 19, 1955 |
| 2,812,911 | De Jean | Nov. 12, 1957 |

FOREIGN PATENTS

| | | |
|---|---|---|
| 484,622 | Great Britain | May 9, 1938 |